United States Patent
Divisek

(10) Patent No.: US 6,833,167 B2
(45) Date of Patent: Dec. 21, 2004

(54) METHANOL FUEL CELL COMPRISING A MEMBRANE WHICH CONDUCTS METAL CATIONS

(75) Inventor: Jiri Divisek, Jülich (DE)

(73) Assignee: Forschungszentrum Julich GmbH, Julich (DE)

( * ) Notice: Subject to any disclaimer, the term of this patent is extended or adjusted under 35 U.S.C. 154(b) by 218 days.

(21) Appl. No.: 10/203,894

(22) PCT Filed: Feb. 3, 2001

(86) PCT No.: PCT/DE01/00443
§ 371 (c)(1),
(2), (4) Date: Aug. 13, 2002

(87) PCT Pub. No.: WO01/61773
PCT Pub. Date: Aug. 23, 2001

(65) Prior Publication Data
US 2003/0012987 A1 Jan. 16, 2003

(30) Foreign Application Priority Data
Feb. 19, 2000 (DE) .......................... 100 07 651

(51) Int. Cl.[7] .................... H01M 8/04; H01M 4/00
(52) U.S. Cl. .................. 428/17; 429/27; 429/29
(58) Field of Search ............... 429/13, 17, 27, 429/29

(56) References Cited

U.S. PATENT DOCUMENTS

| | | | |
|---|---|---|---|
| 4,959,132 A | | 9/1990 | Fedkiw, Jr. ............ 205/344 |
| 5,545,492 A | * | 8/1996 | Zito ...................... 429/29 |
| 5,599,638 A | * | 2/1997 | Surampudi et al. ....... 429/33 |
| 6,248,460 B1 | * | 6/2001 | Surampudi et al. ....... 429/15 |
| 6,391,486 B1 | * | 5/2002 | Narayanan et al. ....... 429/40 |

FOREIGN PATENT DOCUMENTS

| WO | WO 07/40924 | 11/1997 |
|---|---|---|
| WO | WO 99/54389 | 10/1999 |

* cited by examiner

Primary Examiner—Patrick Ryan
Assistant Examiner—Thomas H. Parsons
(74) Attorney, Agent, or Firm—Herbert Dubno

(57) ABSTRACT

The invention relates to a methanol fuel cell comprising a membrane which conducts metallic cations, in which the metallic cations induce the transport of the charge inside the membrane and are advantageously guided in a circuit in the form of a base from the cathode chamber to the anode chamber. The inventive methanol fuel cell prevents the methanol drag associated with proton-conductive membranes, thus producing higher power outputs on a regular basis. A separate transport of the water produced by the reaction is not necessary.

7 Claims, 1 Drawing Sheet

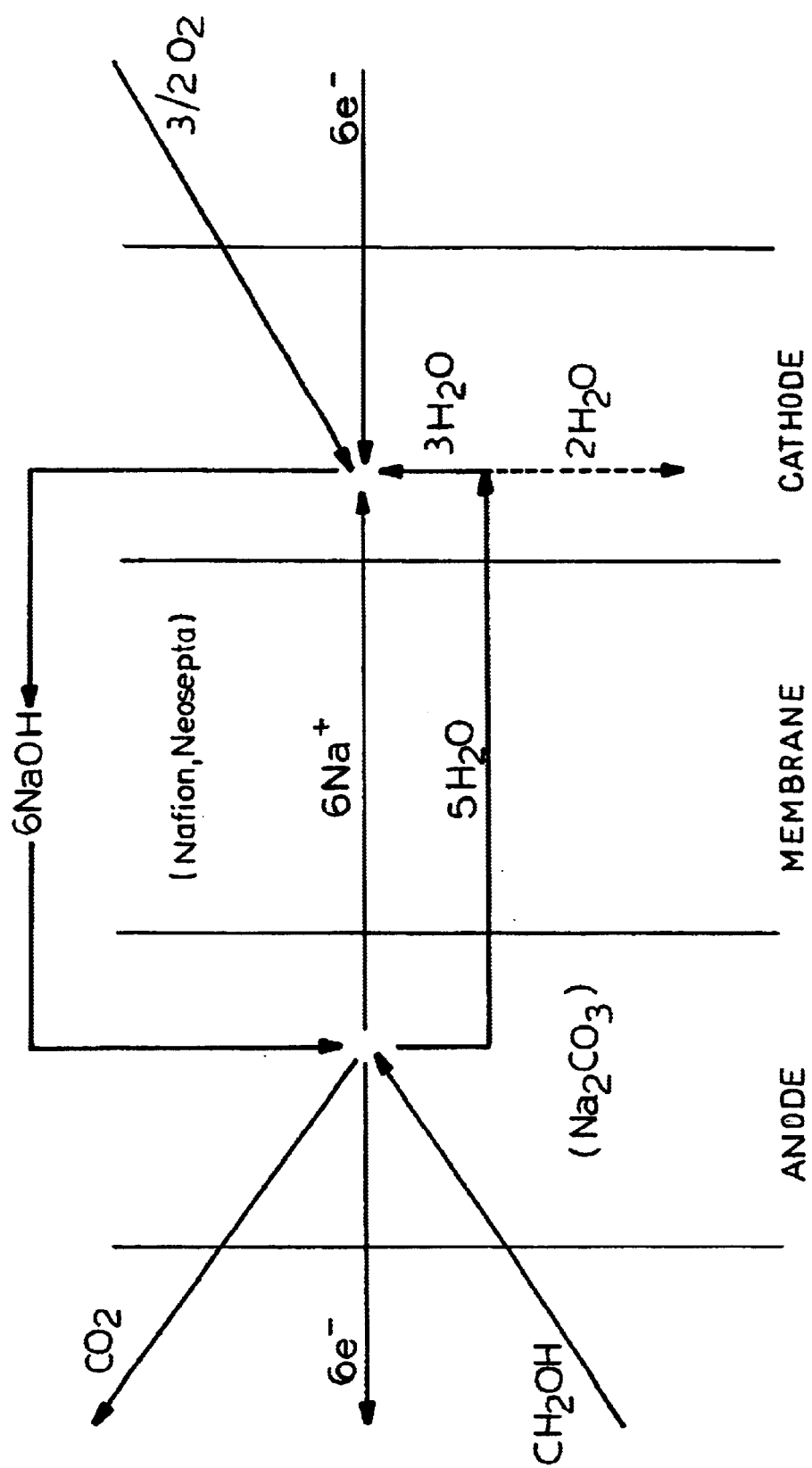

METHANOL FUEL CELL COMPRISING A MEMBRANE WHICH CONDUCTS METAL CATIONS

BACKGROUND OF THE INVENTION

1. Field of the Invention

The invention relates to a fuel cell, especially a methanol fuel cell, and to a method of operating this fuel cell.

2. Description of the Related Art

A fuel cell has a cathode, an electrolyte and an anode. The cathode is supplied with an oxidizing agent, for example, air or oxygen, and the anode is supplied with a fuel, for example, hydrogen or methanol.

Various fuel cell types are known, for example, the SOFC fuel cell (SOFC=solid oxide fuel cell) from the publication DE 44 30 958 C1 and the PEM fuel cell (PEM=proton exchange membrane) from the publication DE 195 31 852 C1.

The operating temperature of a PEM fuel cell is about 80° C. A PEM fuel cell can in principle be either an acid or alkaline fuel cell, depending upon the type of membrane or the working medium. Usually protons are formed at the anode of a PEM fuel cell having a proton conductor in the presence of the fuel by means of a catalyst. The protons pass through the electrolyte and combine at the cathode side with oxygen arising from the oxidation medium to water. Electrons are thereby liberated and electrical energy is generated. The drawback of a methanol fuel cell with a proton conductor is that the protons, under the influence of the electric field, in their solvate shells entrain water molecules along with them. This electrophoresis effect is associated with a very high drag factor (number of entrained water molecules per proton). This means on the one hand that too much water is transported from the anode to the cathode which has a disadvantageous effect on the thermal balance; on the other hand, methanol is entrained which in general can form a mixed potential at the cathode and result in a significant reduction in power.

Multiple fuel cells are as a rule connected together electrically and mechanically to produce large electric power utilizing connecting elements. These arrangements are called fuel cell stacks. For the fuel, methane or methanol, among others, can be used. The mentioned fuels are converted by reformation or oxidation to, among other things, hydrogen or hydrogen-rich gas.

There are two types of methanol fuel cells. The so-called indirect methanol fuel cell in which initially in a preceding process step a hydrogen-rich gas mixture is produced and which is then led into a polymer electrolyte fuel cell of the usual hydrogen type with anodic platinum ruthenium catalysts. This process variant is then comprised of two stages: gas production and the usual fuel cell. A further significantly simpler variant from the point of view of process technology, is the so-called direct methanol fuel cell (DMFC) in which the methanol, without intervening stages from the process technology point of view, is directly fed to the fuel cell. This cell has in comparison to the first, however, the disadvantage that with a proton conductor as an acidic medium, the direct electrochemical oxidation of methanol is a kinetically strongly limited process which, with reference to a fuel cell, gives rise to considerable loss of cell voltage. Even with the best results with the DMFC cells to date these cells hardly can be expected to compete in classical configurations with the indirect methanol fuel cell.

This can as a first instance be due to the fact that both the methanol permeation rate and the water vapor enthalpy in the cathode compartment are too high in the case of the present day cells. Furthermore, because of the unsatisfactory methanol oxidation rate, it is necessary for the operating temperature of the cell to be significantly above 100° C. There is however no appropriate electrolyte which can remain functional above 120° C.

To be economical relative to indirect methanol cells, the DMFC must have voltages smaller by only 100 mV at the same current densities by comparison to the indirect cells (with MeOH-permeation) or around 150 mV smaller without permeation. As simulation results show, the greatest loss originates in anodic overvoltage which derives from the highly irreversible electrode kinetics. For that reason, the catalyst coating must also be uneconomically high; because of the methanol permeation the cathodic catalyst coating must be 10 times higher than is the case with hydrogen cells.

From W. Vielstich: Brennstoffelemente (Fuel elements), Verlag Chemie, 1965, P. 73–91 it is known as state of the art to provide an alkali methanol oxidation in a fuel cell. This method has the advantage, by comparison to the known acid variant, that the electric chemical reactions run far more quickly and thus the power of the fuel cell is significantly higher. In practical applications, KOH is used which is immobilized by a diaphragm in the fuel cell. It has, however, been known for a long time from W. Justi, A. Winsel; Kalte Verbrennung (Cold Combustion), Fuel Cells, Franz Steiner Verlag, Wiesbaden, 1962 that in this process, carbonate is formed as a drawback and can give rise as a rule to plugging up of the diaphragm and to a significant reduction in the conductivity among other things of the carbonate electrolyte in the diaphragm. Furthermore, problems cannot be excluded in the three-phase zone of the catalytic layer of the fuel cell electrode because of carbonate formation.

SUMMARY OF THE INVENTION

It is the object of the invention to provide a fuel cell for the conversion of methanol which is effective and can avoid the aforedescribed drawbacks. It is also an object of the invention to provide a method of operating such a fuel cell.

BRIEF DESCRIPTION OF THE DRAWING

FIG. 1 displays a principle of the methanol fuel cell according to the invention and its method.

DETAILED DESCRIPTION OF THE INVENTION

The methanol fuel cells according to the invention encompass an anode compartment with an anode, a cathode compartment with a cathode and a membrane disposed between the anode and cathode. This membrane is a metal cation-conducting membrane. Under this designation should be understood such a membrane that on its one side accepts metal cations and on the opposite side makes metal cations available. This effect can be achieved by ion exchange, diffusion or also by ion conduction. The membrane advantageously has a good resistance to carbonate. The presence of carbonate as a rule does not result in a plugging of the membrane and also does not itself have a negative effect on the conductivity. By contrast with proton-conductive membranes, which are known from the state of the art, the membrane according to the invention conducts metal cations. Suitable metal cations are, for example, $Li^+$, $Na^+$ or $K^+$. These metal cations have relatively small ionic radii within the group of metal cations and usually show a high conductivity within the membrane. Under the influence of an electric field, they entrain with them, advantageously, in the membrane, only small amounts of water in the form of solvate shells. Furthermore, the membrane according to the invention has only a very limited methanol permeation rate. The membrane according to the invention thus advantageously enables positive charge carrier transport without the drawbacks of methanol permeation and the resulting mixed potential formation at a cathode as usually arises in the case of a proton-conductive membrane.

An advantageous example for a membrane according to the invention is a cation exchange membrane, is for example Nafion® or also Neosepta®. These membranes are typically charged with a monovalent alkali metal, for example $Li^+$, $Na^+$ or $K^+$. They have a good conductivity and have high stability against carbonate solutions. For this reason they are especially suitable for use in an alkali fuel cell.

In an advantageous embodiment of the methanol fuel cell according to the invention, the methanol fuel cell has means which enables a recycling of metal cations from a cathode compartment to an anode compartment or from a cathode to an anode. This means ensures that metal cations, which for example are released from an anode (anode compartment) travel through the membrane to a cathode (cathode compartment) and from there can travel back again to the anode (anode compartment) (circulation). Such means can be realized by a passage between an anode compartment and a cathode compartment. Advantageously, this means according to the invention gives rise to an internal circulation of the metal ions, i.e. within a fuel cell. The means for recycling of metal cations can however also be provided advantageously between different fuel cells so that the resulting metal cation circulation can encompass a plurality of fuel cells.

In a further advantageous embodiment of the methanol fuel cell according to the invention, the cations are available in an alkali solution (base). The means for recycling the metal cations in the simplest case is a liquid passage which connects the anode compartment and the cathode compartment with one another. A suitable means is for example a simple temperature-resistant and corrosion-resistant tube between the anode compartment and cathode compartment. A supply vessel, pump or inlet or outlet can optionally be interposed.

A methanol fuel cell stack according to the invention has at least two and preferably however more fuel cells. In the case in which a multiplicity of methanol fuel cells are connected together according to the invention in a stack, there can be an internal recycling of the metal cation and as well an external recycle of the metal cations for a plurality of fuel cells is conceivable.

For the internal recycle, there is a circulation path for the metal cations within each individual fuel cell. Upon connection of a multiplicity of methanol fuel cells according to the claims one after another, the means for recycling the metal ions can be understood to mean that, for example, metal cations from one anode A1 of one methanol fuel cell BZ1 can pass through the membrane to a cathode K1 and from there via a passage to a further methanol fuel cell BZ2. There the metal cations from an anode A2 are fed through a membrane via a cathode K2 to the anode A1 of the first fuel cell BZ1. In this case, the metal ion circulation encompasses, for example, two methanol fuel cells of a stack. A plurality of fuel cells can also be combined in an optional manner.

In the method of operating a methanol fuel cell according to the invention, during the operation of the fuel cell, metal cations pass through the membrane from the anode to the cathode. The metal cations arise at the anode from the alkali oxidation of the fuel, in this case methanol. From the cathode side the metal cations which are delivered by the membrane bond with the hydroxyl ions which are provided to a base. This is returned to the anode compartment by suitable means. The metal cations assume the role of charge carrier transports within the membrane. They have, because of their ionic radii by comparison with protons, a significantly smaller solvate shell so that advantageously less water is transported with the cations to the cathode by comparison with proton-conducting membranes. The alkali process has the advantage of improved electrochemical conversion at the electrodes so that higher efficiencies are produced normally. Furthermore a separate product water removal is not required.

In the method of operating the methanol fuel cell according to the invention, the metal cations found in the cathode compartment are returned to an anode compartment. Thus a material-serving circulation of the metal cations is enabled.

It is conceivable to provide a direct recycling of the metal cations from a cathode compartment into the anode compartment of a fuel cell as well as the formation of the circulation by connecting a plurality of fuel cells. Advantageously, the recycling of the metal cations is effected in the form of a base, for example sodium hydroxide or potassium hydroxide. This has the additional advantage that the provision of a base both in the anode compartment and in the cathode compartment increases the electrochemical conversion of the methanol or the oxygen by comparison with the corresponding reactions in acid medium.

Below the individual reaction steps of the methanol fuel cell are given (with $Na^+$ by way of example as the metal cation):

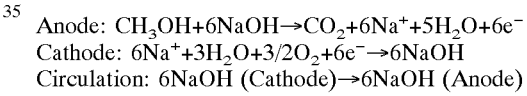

Anode: $CH_3OH + 6NaOH \rightarrow CO_2 + 6Na^+ + 5H_2O + 6e^-$
Cathode: $6Na^+ + 3H_2O + 3/2O_2 + 6e^- \rightarrow 6NaOH$
Circulation: $6NaOH$ (Cathode) $\rightarrow 6NaOH$ (Anode)

The reaction schemes satisfy the overall reaction equations for the combustion reaction of methanol.

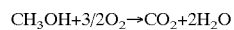

$$CH_3OH + 3/2O_2 \rightarrow CO_2 + 2H_2O$$

and thus is appropriate to the DMFC reaction process.

A process variant is described below which is based on the use of a circulation with alkali ions. This circulation replaces the previous process with product water.

It has been found within the framework of the invention that the drawbacks described at the outset of the state of the art can be largely obviated by the use of an alkali DMFC. This has the following advantages in principle:

The alkali process method is basically not connected with the described drag problem. Either alkali ions are transported, i.e. the ionic current direction in the membrane is effected in the opposite direction than in the acid medium, or as in the case of the invention, alkali ions are used in which the drag factor and the methanol permeation rate connected therewith is generally held below that in a proton-conductive membrane.

The anodic methanol oxidation is effected by a basic catalyzed dehydrogenation whereby the hydrogen formed itself is electrochemically active. It is therefore to be expected that the overall catalysis runs more effectively than in acid medium.

The cathodic oxygen reduction in alkali medium is not as strongly limited as in acid medium. Even here, voltage recovery can be expected.

It is thus possible to eliminate the need for noble metals as catalysts. Raney nickel can be used as electrode material in alkali medium as the methanol electrode. For the oxygen electrode, for example, silver, cobalt or nickel are conceivable as catalysts.

A corresponding process diagram has been shown in FIG. 1. A cation exchange membrane (Nafion®, Neosepta®) charged with a monovalent alkali metal (Li, Na, K) can be used. These membranes exist already and have been especially developed for chloralkali electrolysis so that stabilization problems or the like do not come into question. The Nafion® membrane has as is known, unusual stability in carbonate solution and has been used already for that purpose. The electrical conductivity is identical as in the case of chloralkali electrolysis. It is however significantly less than with proton systems. Exact values must be measured, an estimate gives a factor of 2 to 3.

By comparison to the usual proton conductive DMFC cell, with the methanol fuel cell of the invention, it is necessary to introduce an additional cathodic-anodic hydroxide circulation. A separate product water path is not required since the cationic flow is associated with a certain drag factor. To maintain the process, the drag factor of 5/6 must be provided at a minimum. With respect to the size of the cation, it is to be expected that significantly less water and thus also methanol will be transferred from the anode to the cathode than in the proton-conducting DMFC cell.

What is claimed is:

1. A method of operating an alkali methanol fuel cell with a metal cation conducting member with the steps of
   liberating metal cations from an alkali solution at the anode,
   passing the metal cations under the influence of an electric field through the metal cation conducting membrane from the anode to the cathode.

2. The method of operating an alkali methanol fuel cell according to claim 1 in which the metal cations are returned from the cathode to the anode.

3. The method of operating an alkali methanol fuel cell according to claim 1 with the steps of
   liberating at the anode the metal cations from a base having metal cations present at an anode side;
   forming a base with metal cations traveling through the membrane to the cathode with hydroxyl ions present there;
   returning the base containing the metal cations from the cathode to the anode.

4. The method of operating an alkali methanol fuel cell stack with at least two methanol fuel cells according to claim 1 in which the metal cation in the cathode compartment of a first alkali methanol fuel cell are fed to the anode compartment of a second alkali methanol fuel cell.

5. An alkali methanol fuel cell for carrying out the method according to claim 1 encompassing an anode compartment with an anode, a cathode compartment with a cathode, and a membrane disposed between the anode and the cathode, characterized by a metal cation conducting membrane and means for returning metal cations in the form of a basic solution from the cathode compartment to the anode compartment.

6. An alkali methanol fuel cell according to claim 5 with a liquid passage between the anode compartment and the cathode compartment as the means for returning.

7. A fuel cell stack encompassing at least one alkali methanol fuel cell according to claim 5.

* * * * *